April 28, 1959  E. SCHENKENGEL  2,883,869
EMBROIDERY TRANSMISSION MECHANISM FOR SEWING MACHINES
Filed Dec. 31, 1956

INVENTOR
EMERICH SCHENKENGEL

BY Robert H. Jacob
AGENT

April 28, 1959     E. SCHENKENGEL     2,883,869
EMBROIDERY TRANSMISSION MECHANISM FOR SEWING MACHINES
Filed Dec. 31, 1956     2 Sheets-Sheet 2

INVENTOR:
EMERICH SCHENKENGEL
BY Robert H. Jacob
AGENT

2,883,869

EMBROIDERY TRANSMISSION MECHANISM FOR SEWING MACHINES

Emerich Schenkengel, Kaiserslautern, Pfalz, Germany, assignor to G. M. Pfaff A.-G., Kaiserslautern, Pfalz, Germany Application December 31, 1956, Serial No. 631,790

Claims priority, application Germany April 24, 1956

4 Claims. (Cl. 74—217)

The invention relates to an embroidery transmission for sewing machines of the type driven by an electro-motor by way of a pulley.

For the purpose of obtaining the slow rotation required for embroidery and darning work it has been known to provide stepped pulleys with belt drive between the motor shaft and the balance wheel or to the belt pulley of the machine. In order to connect the reduction gear it is necessary in this type of an arrangement to exchange or locate two belts, which results in difficulties.

It is an object of the invention to provide an embroidery transmission where in connecting the transmission the main drive belt remains in its operative position, where furthermore the tensions of main and auxiliary belts can be changed simultaneously or separately and which, moreover, may be installed subsequently in existing sewing machines without substantial changes.

In accordance with the invention this object is attained by means of a belt pulley which is in the form of a coupling member for the balance wheel of the machine and a transmission driven in its operative position by the main drive belt and which cooperates with the coupling member by way of an auxiliary belt while disposed in position of disengagement from the balance wheel.

In this connection it is advantageous to rigidly secure the threaded coupling member which in the disengaged position rests against an abutment by a centrally disposed set or lock screw which screw in its position of operation presses against the surface of the shaft.

The transmission may be mounted upon an adjusting member received in the guide for the support for the tension pulley of the main drive belt which has a common adjusting screw with the support.

Figure 1:
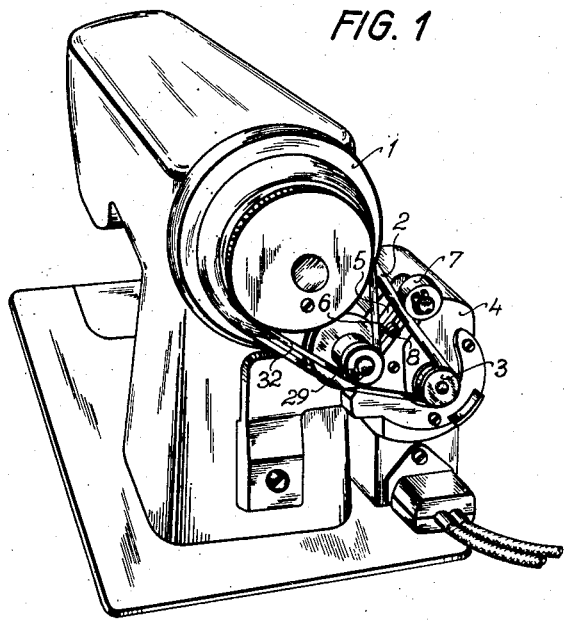
Figure 2:
Figure 4:
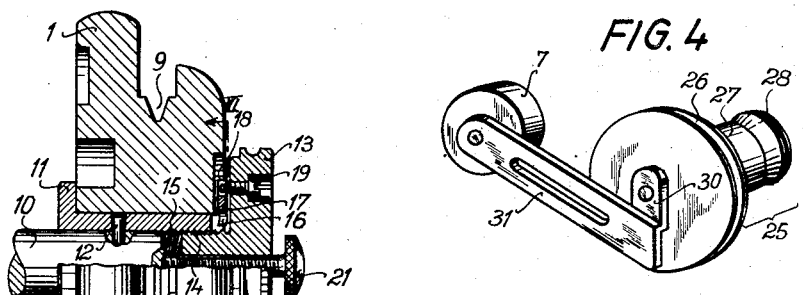
Figure 3:
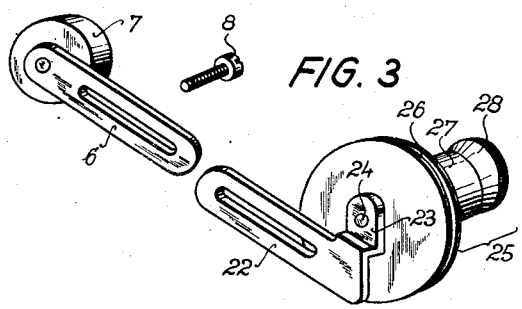
Figure 5:
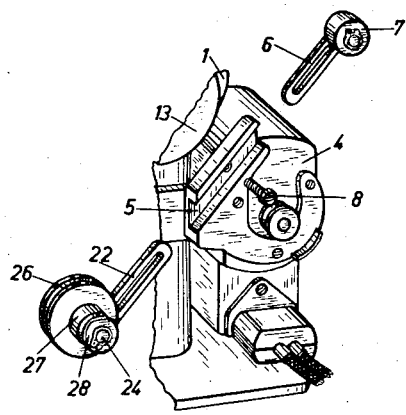
Figure 6:
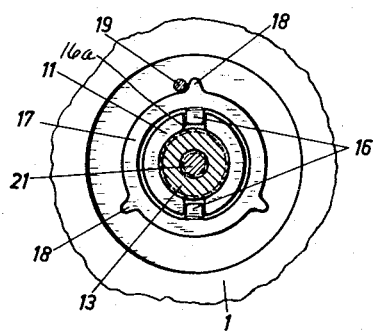

The invention will be more clearly understood by reference to the accompanying drawing in which, by way of example, an embodiment of the invention is illustrated and where:

Fig. 1 is a perspective view of a sewing machine equipped with the new embroidery transmission, Fig. 2 is a view partly in section of the hand wheel and the threaded coupling member, Fig. 3 is the transmission secured upon an adjustable member and the tension pulley together with the supporting arm, Fig. 4 is the transmission secured directly to the supporting arm, Fig. 5 illustrates in an exploded view the manner in which the transmission is mounted on the end of the motor, and Fig. 6 is a sectional view taken along the line VI—VI in Fig. 2, illustrating the relationship of the parts of the coupling device.

For normal sewing the balance wheel 1 of the machine is driven by way of the main belt 2 from the motor pulley 3 of the electro-motor 4. In the motor housing the support 6 for the tension pulley 7 is mounted in the guide conformation 5 and fastened.

The balance wheel 1 provided with the belt pulley 9 is provided in the usual manner upon the arm shaft 10 of the machine. It is freely rotatable upon the arm shaft sleeve 11 which in turn is secured to the arm shaft 10 by means of a tapered pin 12. The threaded member 13 establishes the coupling between the balance wheel 1 and the arm shaft 10 in that by rotation in one direction it effectively connects both members by way of its outer threaded portion 14 and the inner threads 15 of the sleeve 11 of the arm shaft. The transfer of the engagement pressure is effected by a ring 17 which is mounted upon and in angularly fixed position relative to the sleeve 11 of the arm shaft, which ring engages the balance wheel 1 and which is provided with projections 16 against which presses the threaded coupling member 13 to retain projections 16 in recesses 16a endwise of sleeve 11. The coupling is released by turning the member 13 in the opposite direction. The angle of rotation of the threaded coupling member 13 is limited by two of the abutments 18 on ring 17 against which a contact screw 19 abuts.

The enlarged portion of the coupling member 13 is provided with a belt groove 20 and a lock screw 21. An adjusting member 22 is received in the guide conformation 5 below the support 6 and is secured by means of screw 8. A shaft 24 is secured in a lug 23 of the adjusting member 22 upon which the transmission is adapted to rotate. The transmission is a unitary structure comprising a large grooved pulley or disk 26, a spacing portion 27 and a small grooved pulley or disk 28. A lock ring 29 is provided to retain the transmission upon the shaft 24.

In another embodiment of the invention the shaft 24 of the transmission 25 is secured in a lug 30 of an adjustably mounted support 31 which at the same time supports the tension pulley 7.

In both embodiments the drive connection between the small grooved disk 28 of the transmission 25 and the belt groove 20 on the coupling member 13 is provided by an auxiliary belt 32.

If the machine is to be adjusted for embroidery or darning work the support 6 together with the tension pulley 7 is removed by releasing the screw 8 and then inserting either the adjustable member 22 carrying the transmission 25 below the support 6 or by completely removing the support 6 and substituting the support 31 with its tension pulley 7 and transmission 25. In both cases fastening is effected by means of screw 8. The main drive belt 2 during this change remains in its operative position, either during insertion of the adjustable member 22 in the first instance, or in the second instance during the insertion of the support member 31.

The threaded coupling member 13 without the abutment screw 19 is first turned clockwise until the projections 16 of ring 17 are barely touched by member 13 so that balance wheel 1 can still freely rotate relative to sleeve 11 and therefore relative to shaft 10. Now merely a very small rotary clockwise movement of member 13 (less than 120°) is required to press ring 17 against balance wheel 1 for establishing frictional engagement. This is the normal coupling position of member 13 in which the balance wheel 1 is connected with arm shaft 10 by friction of the balance wheel with ring 17 and the latter with the sleeve 11 by means of projections 16 engaging recesses 16a.

If the abutment screw 19 is now turned into member 13 the adjustment is limited to two possible positions, less than 120° apart by two of the three abutments 18, which is ample to release the rigid connection between the balance wheel and arm shaft 10, the release being effected by rotating the coupling member 13 counterclockwise to remove the pressure on ring 17. The balance wheel will then rotate freely on sleeve 11 while further outward turning of the coupling member 13 is prevented by abutment screw 19 and one of the abutments 18. If the coupling member 13 is driven counterclockwise by way of belt 32 ring 17 is carried along by the abutment 18 and the ring in turn by way of projections 16 carries along the arm shaft sleeve 11 and shaft 10. Now the balance wheel is loose on sleeve 11 while the sleeve is coupled with coupling screw 13.

Sudden release of the motor driving power could result in unfavorable inertia conditions of the belt 32 by exerting a counterclockwise force on the coupling member 13 whereby this member could be tightened to restore coupling between shaft 10 and balance wheel 1. To prevent this the set screw 21 is provided which upon tightening against shaft 10 will prevent the member 13 from approaching balance wheel 1, i.e. member 13 will not rotate clockwise with respect to sleeve 11 and ring 17.

Thus it is insured that the abutment screw 19 remains in engagement with abutment 18 by way of which the drive connection between coupling member 13 and arm sleeve 11 was established even if member 13 applies a counterclockwise force.

If the adjusting member 22 is employed, the setting of the tension of the main drive belt 2 is effected as usual by adjusting the tension pulley 7. Displacing the adjusting member 22 controls the engagement pressure of the large grooved pulley 26 of the transmission 25 against the main drive belt 2.

Rotating the coupling member 13 results in a known manner in releasing the connection between the balance wheel 1 and arm shaft 10. The lock or set screw 21 is rotated against the arm shaft 10 until it rests securely against its surface. It is now possible to install the auxiliary drive belt 32 because the main drive belt 2 idles upon release of the coupling member 13.

The belts of plastic materials which are now frequently used are so elastic that the simultaneous adjustability of the tension pulley 7 and the transmission 25 by means of support 31 is quite sufficient.

If upon changeover the electro-motor 4 is operated, the balance wheel 1 runs idly upon the sleeve 11 of the arm shaft. The transmission 25 which rests against the main drive belt 2 with its large groove pulley portion drives the coupling member 13 by way of the small grooved pulley portion 28 and the auxiliary belt 32 while the coupling member 13 carries along sleeve 11 of the arm shaft and thus the arm shaft 10 proper by way of one of the abutments 18, while the non-shifting engagement against the abutment 18 is secured by the set or lock screw 21.

I claim:

1. A transmission attachment device for a motor powered, belt driven sewing machine of the type having a shaft, a sleeve fixedly mounted on said shaft, a balance wheel rotatably mounted on said sleeve, a motor having a drive pulley, a drive belt connecting said balance wheel and said drive pulley, a coupling member disposed endwise of said shaft, said sleeve and said balance wheel and having a threaded portion in threaded adjustable engagement with said sleeve and defining a pulley circumferentially thereof, a coupling disk disposed intermediate said balance wheel and said coupling member and a lock screw extending through said coupling member for firm engagement with said shaft, said attachment device comprising a transmission pulley having a large grooved portion and a small grooved portion, a transmission pulley support member and an auxiliary belt, said large grooved portion being in alignment with said balance wheel and operatively engaging said drive belt and said auxiliary belt extending intermediate said small grooved portion and said pulley on said coupling member.

2. A transmission attachment device for a motor powered, belt driven sewing machine of the type having a shaft, a sleeve fixedly mounted on said shaft, a balance wheel rotatably mounted on said sleeve, a motor having a drive pulley, a drive belt connecting said balance wheel and said drive pulley, a coupling member disposed endwise of said shaft, said sleeve and said balance wheel and having a threaded portion in threaded adjustable engagement with said sleeve and defining a pulley circumferentially thereof, a coupling disk disposed intermediate said balance wheel and said coupling member and a lock screw extending through said coupling member for firm engagement with said shaft, said attachment device comprising a transmission pulley having a large grooved portion and a small grooved portion, a transmission pulley support member and an auxiliary belt, said large grooved portion being in alignment with said balance wheel and operatively engaging said drive belt and said auxiliary belt extending intermediate said small grooved portion and said pulley on said coupling member, said coupling member in position of disengagement from said coupling disk being coupled to said shaft by way of said lock screw and said sleeve thereby providing for rotation independently of said balance wheel.

3. A transmission attachment device for a motor powered, belt driven sewing machine of the type having a shaft, a sleeve fixedly mounted on said shaft, a balance wheel rotatably mounted on said sleeve, a motor having a drive pulley, a drive belt connecting said balance wheel and said drive pulley, a coupling member disposed endwise of said shaft, said sleeve and said balance wheel and having a threaded portion in threaded adjustable engagement with said sleeve and defining a pulley circumferentially thereof, a coupling disk disposed intermediate said balance wheel and said coupling member and a lock screw extending through said coupling member for firm engagement with said shaft, said attachment device comprising a transmission pulley having a large grooved portion and a small grooved portion, a transmission pulley support member and an auxiliary belt, said large grooved portion being in alignment with said balance wheel and operatively engaging said drive belt and said auxiliary belt extending intermediate said small grooved portion and said pulley on said coupling member, said transmission pulley support member carrying a tension pulley proximate said drive belt at its end opposite the end supporting said transmission pulley and being supported in a guide conformation of the motor by an adjusting screw common to said transmission pulley and said tension pulley.

4. A transmission attachment device for a motor powered, belt driven sewing machine of the type having a shaft, a sleeve fixedly mounted on said shaft, a balance wheel rotatably mounted on said sleeve, a motor having a drive pulley, a drive belt connecting said balance wheel and said drive pulley, a coupling member disposed endwise of said shaft, said sleeve and said balance wheel and having a threaded portion in threaded adjustable engagement with said sleeve and defining a pulley circumferentially thereof, a coupling disk disposed intermediate said balance wheel and said coupling member and a lock screw extending through said coupling member for firm engagement with said shaft, said attachment device comprising a transmission pulley having a large grooved portion and a small grooved portion, a transmission pulley support member and an auxiliary belt, said large grooved portion being in alignment with said balance wheel and operately engaging said drive belt and said auxiliary belt extending intermediate said small grooved portion and said pulley on said coupling member, said transmission pulley support member being secured to the motor in a guide formation by means of an adjusting screw retaining a member carrying a tension pulley.

References Cited in the file of this patent

UNITED STATES PATENTS

| | | |
|---|---|---|
| 2,159,722 | Bedard | May 23, 1939 |
| 2,617,375 | Peets | Nov. 11, 1952 |
| 2,774,248 | De Moss | Dec. 18, 1956 |